United States Patent [19]
Fohlen et al.

[11] 3,928,708

[45] Dec. 23, 1975

[54] TRANSPARENT FIRE RESISTANT POLYMERIC STRUCTURES

[75] Inventors: George M. Fohlen, Millbrae; John A. Parker, Los Altos; Paul M. Sawko, San Jose, all of Calif.

[73] Assignee: The United States of America as represented by the United States National Aeronautics and Space Administration Office of General Counsel-Code GP, Washington, D.C.

[22] Filed: Jan. 29, 1974

[21] Appl. No.: 437,556

[52] U.S. Cl. ............ 428/412; 264/331; 428/413; 428/447; 428/920; 428/921; 428/911
[51] Int. Cl.² .................. B32B 27/36; B32B 27/38
[58] Field of Search .......... 161/183, 184, 206, 208, 161/403, 404; 260/47 EP, 47 XA, 37 EP; 428/412, 413, 447, 920, 921, 911

[56] References Cited
UNITED STATES PATENTS

| | | | |
|---|---|---|---|
| 3,036,036 | 5/1962 | Howe | 260/47 XA |
| 3,189,662 | 6/1965 | Vaughn | 260/824 |
| 3,208,902 | 9/1965 | Arand et al. | 161/183 X |
| 3,419,635 | 12/1968 | Vaughn | 260/47 XA |
| 3,558,408 | 1/1971 | Hamilton et al. | 161/183 X |
| 3,641,204 | 2/1972 | Lundberg et al. | 161/183 X |
| 3,652,379 | 3/1972 | White et al. | 161/183 |
| 3,673,055 | 6/1972 | Sheld | 161/183 |
| 3,740,305 | 6/1973 | Hoback et al. | 161/183 |
| 3,742,083 | 6/1973 | Bialors | 260/47 XA |
| 3,810,815 | 5/1974 | Welhart et al. | 161/183 |
| 3,819,747 | 6/1974 | Bertram et al. | 260/37 EP |

FOREIGN PATENTS OR APPLICATIONS

| | | |
|---|---|---|
| 659,074 | 7/1965 | Belgium |

OTHER PUBLICATIONS

Lee, Henry & Neville, Kris, Handbook of Epoxy Resins, (New York: McGraw-Hill), pp. 11-10 & 11-11 relied on.

*Primary Examiner*—George F. Lesmes
*Assistant Examiner*—Alan T. McDonald
*Attorney, Agent, or Firm*—Darrell G. Brekke; Armand G. Morin, Sr.; John R. Manning

[57] ABSTRACT

Transparent impact-, heat- and fire-resistant polymeric materials for making windows, windshields and plane canopies are provided wherein the polymeric materials comprise an exposy resin cured with an alkoxy boroxine catalyst and a polycarbonate resin, preferably a polyphenolphthalein carbonate resin. Laminates including the advantages of both resins comprise a transparent layer of epoxy resin and a transparent layer of a polycarbonate resin joined together with a transparent adhesive interlayer.

10 Claims, No Drawings

TRANSPARENT FIRE RESISTANT POLYMERIC STRUCTURES

The invention described herein was made by employees of the United States Government and may be manufactured and used by or for the government for governmental purposes without the payment of any royalties thereon or therefor.

BACKGROUND OF THE INVENTION

This invention relates to the manufacture of transparent heat and fire-resistant polymeric structures intended for use as windows, windshields and canopies, specifically for supersonic aircraft, but which will find wider applications generally, as in conventional subsonic aircraft, railroads, ships, as well as in many stationary structures.

DESCRIPTION OF PRIOR ART

Supersonic aircraft can encounter surface temperatures of up to 260°C due to aerodynamic friction. Polymers intended for window or canopy use should have a glass transition temperature near this value. The threat of bird striking aircraft windows requires that they be impact resistant to a 2 Kg bird at a velocity of about 300 m/sec. Another requirement of improved polymeric aircraft windows is that they be fire resistant and provide a means of preventing the radiative transfer of heat into the interior of the plane from an external fuel fire that can result from a crash landing with subsequent rupture of fuel tanks and ignition.

The current state of the art polymeric materials used for aircraft windows and canopies are made of either polymethylmethacrylate (PMM) or polybisphenol A carbonate. Even though the yield stress values of these materials are adequate for normal subsonic aircraft canopies, these values become zero at operating temperatures near 260°C. PMM has a glass transition temperature of about 105°C, and the polybisphenol A carbonate, 155°C, both not sufficiently high enough for canopies of aircraft operating at speeds up to Mach 3.

The impact strength of polymethylmethacrylate (PMM) as measured by the standard ASTM D 256 Izod test has a value of 16 to 21 NM/M (Newton-meters per meter of notch) while the polybisphenol A carbonate has a value of up to 70 Nm/m. Only the latter material among the state-of-the-art polymeric materials is known to approach the impact resistance required to withstand a 300 m/sec bird strike.

None of the state-of-the-art transparent polymers are resistant to fire or to thermal radiation penetration. PMM melts, depolymerizes and burns readily leaving no ash. The biaxially stretched acrylate material more commonly used fails even more readily upon heating, developing deep fissures due to stress relief at fairly low temperatures. It has a Limiting Oxygen Value, the lowest oxygen concentration that will just support combustion in a standard test, of 18%. In an oxygen-free atmosphere PMM begins to decompose about 250°C, loses weight rapidly at 400°C leaving about 2% residue at 450°, none at 550°C. The polybisphenol A carbonate in a fire situation melts, decomposes, and burns as long as the flame is present but extinguishes when the flame is removed — flaming droplets are ejected. Carbon monoxide and dioxide is formed within the molten polymer while burning. The limiting oxygen value for polybisphenol A carbonate is 23%. Thus, this material is classified as self-extinguishing. The melting temperature of this polymer is about 260°C and decomposes rapidly in the absence of oxygen at 460°C to leave a char yield of 20% at 700°C.

BRIEF SUMMARY OF THE INVENTION

The principal object of the present invention is to provide transparent windows and canopies, particularly for supersonic aircraft, which have improved fire-, heat- and impact-resistance.

One effective means of providing protection from the radiative transfer of heat through a polymeric window is by a combined intumescence and charring process to provide a structure that is opaque to radiation and still has good mechanical integrity. For this purpose a polymer having an anerobic char yield at 700°–800°C of about 40% is desired. It has previously been shown by J. A. Parker and E. L. Winkler in "The Effects of Molecular Structures," NASA TR-R-276, November, 1967 that char yield values are related to the number of multiply bonded aromatic rings. The materials herein proposed as suitable for our described objectives have a relatively high content of aromatic ring structures, are capable of thermochemical crosslinking reactions necessary for yielding relatively large amount of char and furthermore, the starting materials have the essential requirement of being transparent. These polymeric materials of the invention fall into two general classes. The first is an epoxy resin formed from an aromatic diglycidyl ether, the second is a polycarbonate. The materials are obtained as transparent plates and can be used either monolithically; i.e., alone or in the form of laminates depending upon the applications and properties desired.

Various epoxy resins are suitable for the practice of the invention. Preferred resins, however, are diglycidyl ethers of Bisphenol A. Typical examples of such resins are the "Epon" series of epoxy resins marketed by Shell Chemical Co. and mono- and di-methylolated epoxy resins marketed as the "Apogen" series by the M & T Chemical Company of Rahway, New Jersey. Epoxy resins are well known and many are disclosed in the "Handbook of Epoxy Resins" by Lee & Neville, 1967, McGraw-Hill Book Co., New York, N.Y. The Apogen type of epoxy resins are methylolated derivatives of the DGEBA resins and are disclosed in Belgian Pat. No. 659,074 issued July 29, 1965 to C. G. Schwarzer and in the manufacturer's Apogen literature.

The polyether is made from diglycidyl ether of Bisphenol A, or the mono- or di-methylolated derivatives thereof, using an alkoxyboroxine as the catalytic curing agent. The diglycidyl ether of bisphenol A (DGEBA) is available commercially from several manufacturers. Typical is Epon 825 from Shell Chemical Co. or Dow Epoxy Resin 332. These materials are almost colorless viscous liquids, frequently crystalline at room temperature having an equivalent weight of 172–178 per epoxide group, having a viscosity of 4000 to 6000 centipoises at 25°C. The Apogen resins are a family of Bisphenol A type diglycidyl ethers that have been modified by incorporating methylol groups adjacent to highly active positions. Apogen 101 typically has an equivalent weight of 205–225, a viscosity range of 8,000 to 11,000 centipoises at 50°C and has about 80% monomethylol and 20% dimethylol substitution.

The use of boroxines as a curing agent for the diglyidyl ether of Bisphenol A has been studied in some detail by Christie and Medved and reported in 1961:

Final Report, Midwest Research Institute, Feb. 28, 1961, Document AD 255980, Armed Services Technical Information Agency, "Development and Evaluation of High Temperature Resistant Composite Plastic Plates," and is also mentioned in the Lee & Neville Book. This curing agent results in almost colorless castings having higher heat resistance and much better ultraviolet resistance than when the more common epoxy curing agents are used, such as the polyamines, polyamides, aromatic or cycloaliphatic anhydrides.

The mono- and di-methylolated derivatives of the DGEBA provide the type of ring substituion in which the reactive methylol group is expected to lead to a more highly crosslinked polymer having increased heat and thermal stability and higher char yield. Although there is no previous description of the use of boroxines to cure these methylolated derivatives, boroxines are described in the literature as general epoxy curing agents.

The preferred boroxine is trimethoxyboroxine (TMB). It is a colorless volatile, easily hydrolyzable liquid having a decomposition point of about 130°C, a density at 25°C of 1.216 and a refractive index of 1.3993. It is soluble in acetone, benzene and chloroform and has a boron content of 18.7%.

Another boroxine, tri-isopropoxyboroxine, is available commercially and was used as a curing agent in several formulations. This material, however, is a solid and presents mixing problems unless used in combination with TMB.

The quantity of TMB used to cure the DGEBA may be varied within limits. The optimum concentration as determined by physical properties developed in the cured polymer was found to be between 5 to 7 parts of TMB to 100 parts of the DGEBA. This is much less than a stoichimometric equivalent amount of TMB and the polymerization is believed to proceed by a Lewis acid type catalytic mechanism through the glycidyl groups to give an aromatic polyether.

The cure cycle can also be varied within limits. For instance, cure cycles up to 12 hours at the 80°C temperature and at the intermediate 135°C may be used instead of the 3 hours at 180°C given in Example 1. These changes did not result in any deterioration of properties. Prolonged cure at the highest temperature 180°C results in increasing color of the casting.

DESCRIPTION OF PREFERRED EMBODIMENTS

The following examples serve to illustrate the present invention by describing specific methods of preparation, fabrication and testing. It is to be understood that the invention is not limited to the scope of the examples herein.

EXAMPLE 1

To 2,000 grams of Epon 825, warmed to 40° to 45°C to reduce its viscosity, is added 100 grams of TMB and mixed thoroughly by hand stirring. The mixture is degassed gradually in a vacuum chamber to remove all air and volatile substances. The viscous mixture is then poured into a metal mold, prewarmed to about 45°C, using a long tube to fill the mold with the minimum inclusion of air, the tube being withdrawn as the mold is filled. The mold was constructed of two ¼-inch steel plates, 16 × 16 inches in size polished to a mirror finish and gold plated, bolted together on three sides using ½ inch spacers. When the mold was filled with resin it was placed in an oven and cured for 3 hours at 80°C, then 3 hours at 135°C and finally at 180° for 3 hours. The casting was permitted to cool slowly in the oven before unmolding. A clear, almost colorless casting was obtained. This was sawn to proper size and flanges and radii machined as necessary. The still flat piece was then curved to the proper radius by sagging to shape on a form in an oven at 150°C for about 1 hour.

An improved and preferred technique would be to strain or filter the warmed mixture of DGEBA and TMB through a fine screen or fibrous mat to remove coarse gels and particles that may be occasionally present and to fill the mold under vacuum. The molds may be made of glass or other polished metals suitably coated with a release agent.

The technique of casting this epoxy resin using flat molds with the properly sized machined and shaped spacing gaskets and the subsequent sagging of the cured casting to curvature results in great cost savings in mold designs.

EXAMPLE 2

By replacing the DGEBA of Example 1 with Apogen 101, the predominantly mono-methylolated derivative of DGEBA and preheating this material to 60° to insure complete mixing of this more viscous material with the TMB, and otherwise proceeding as in Example 1, a clear transparent casting of good color and strength was obtained.

Thermogravimetric analysis in nitrogen of the two polymeric polyethers obtained above showed that the material obtained from DGEBA had a temperature of decomposition, $T_D$, of 403°C and an anerobic char yield at 700°C of 34%, while the Apogen 101 derived polyether had a $T_D$ of 370°C and a char yield of 45%.

The prior art polybisphenol A carbonate has the highest impact strength of the transparent polymers. It is commercially available and is sold, for example, under the trademark "Lexan" by General Electric Co., as "Merlon" by Mobay Company, and as "Makrolon" by Bayer Co. of Germany. The synthesis of this polymer is well described in the literature (H. Schnell, The Chemistry & Physics of Polycarbonates, Interscience, New York, 1964, and W. R. Sorenson and Tod W. Campbell, Preparative Methods of Polymer Chemistry, 2nd Edit. Interscience Publishers, N.Y., 1968, p. 140–1). Polycarbonate polymer of this type is available as molding pellets, and as transparent sheets of varying thicknesses.

To increase the thermal- and heat-resistance of this class of polymer which otherwise has good impact properties, phenophthalein was selected as a starting monomer because of additional aromaticity and a lactone structure capable of undergoing thermochemical reactions leading to crosslinking.

The following example 3 demonstrates the preparation of polyphenolphthalein carbonate from the monomer by a known interfacial polymerization technique. See for example "Preparative Methods of Polymer Chemistry" Sorenson and Campbell, Interscience Publishers, 1968, page 143.

EXAMPLE 3

The reaction was conducted using a 5 liter Morton flask having provision for $N_2$ or phosgene addition as well as an effluent gas caustic scrubber. Phenolphthalein (95.4 g), tetramethyl ammonium chloride (25 g), 2½ liter methylene chloride and 200 ml of water were all placed in the flask after which sodium hydroxide (40 g in 80 ml of water) was added. A brisk $N_2$ stream was passed through the stirred solution. Phosgene was then bubbled into the well stirred mixture ($N_2$ flow was reduced). After about 2 hours the color had faded to a light pink and about 20 ml of 25% caustic was added. This regenerates the color, but continued phosgene flow discharged the color; however, color was regained when caustic was added. This cycling titration, using phosgene and caustic, was repeated eight times, the color being discharged faster on successive cycles until finally no color resulted when caustic was added. Roughly nine hours were required to accomplish this. The emulsion was stirred overnight (no phosgene addition, but slow $N_2$ flow) and then acetic acid was carefully added (foams) after which the polymer phase was leached with water eight times and then acetone added to precipitate the polymer. The collected polymer was washed with acetone and then hexane, and dried. Dry weight was 81 g. This was redissolved in methylene chloride and washed with dilute caustic, dilute acetic acid, and then water; precipitated using acetone, washed with ethanol, acetone, hexane, and then dried, yielding 49½ g of polymer. $Visc_{(inh)} = 1.28$, $T_g = 270°$.

Variations in the above procedure may involve the use of different kinds of quarternary ammonium catalysts such as benzyl trimethylammonium chloride or hydroxide, tetraethyl ammonium hydroxide and in amounts ranging from 1.25% based on weight of phenolphthalein to 25%. The polyphenolphthalein carbonate polymer has been described in previous literature, as in U.S. Pat. No. 3,036,036.

The polyphenolphthalein carbonate is obtained as a bulky white powder from the synthetic process described in Example 3. The inherent viscosity of the polymer was determined using a 0.5% solution in dichloromethane. Various preparations showed values from 0.6 to 1.15 dl/g. The glass transition point, $T_g$, as determined by a differential scanning colorimeter and also by differential thermal analysis gave values of 220°–280°C. The polymer did not show a true melting point but softened at about 295°C. Thermogravimetric analysis in nitrogen showed a decomposition temperature of 425°C and an anerobic char yield of 54% at 700°C. The corresponding values for the common polybisphenol A carbonate are glass transition temperature of 150°C, melting temperature of 190°, a decomposition temperature of 400°C and a char yield of 20%.

Thin films could be formed by casting solutions of the polymer onto glass or polished plates. The polymer was soluble in dichloromethane, chloroform, dimethyl formamide, pyridine, sym-tetrachloroethane, dioxane, cyclohexanone, 1,2-dichloroethane, N-methylpyrrolidone and m-cresol.

Fabrication of the powdered polymer into sheets or plates of sufficient thickness for use as glazing or windows was rendered somewhat difficult because of the high softening temperature and low melt-flow properties of the polymer. Two fabrication techniques were found to be applicable, the first requiring the use of solvent, such as acetone or dichloromethane or a mixture thereof to swell the polymer powder, thereby acting as a plasticizer and in effect lowering the glass transition temperature of the polymer. This swollen polymer is then compressed in a mold and by judicious choice of vacuum, temperature and molding pressures, a clear transparent plate may be obtained. Retained solvent content could be further reduced by placing the molded plate in a vacuum oven. A second technique developed requires a high temperature, high pressure compression molding operation.

The following example demonstrates the making of sheets by a solvent technique.

EXAMPLE 4

Four hundred grams of dried polyphenolphalein carbonate powder having an inherent viscosity of 0.93 was added to a mixture of 1600 grams of acetone and 80 grams of freshly distilled dichloromethane. After complete mixing the polymer mass had the consistency of a rubbery dough with excess liquid present. This was decanted and the solvent content of the polymer mass allowed to approach 40%. This plasticized mass, now a grainy translucent material was molded successively at 100°C at 250 pounds per square inch pressure, then at 150°C at 300 to 500 psi and finally at 220°C at 1000 psi pressure. The panel so formed retained solvent and was then devolatilized by heating in an oven at 50°C for one week at atmospheric pressure, then at room temperature under vacuum for 2 weeks, then gradually increasing the temperature while under vacuum according to the following schedule: 50°C for 3 days, 100°C for 7 days and finally 130°C for 2 months. The solvent content as determined by TGA analysis to 300°C in air was less than 2%. A sample of polymer from the panel had an inherent viscosity of 1.04, approximately the same as the starting polymer.

Clear transparent panels could be obtained using the above procedure. Care had to be exercised to use dry polymer free of traces of metal contaminants and freshly distilled dichloromethane which otherwise could cause discoloration of the polymer panels. Chrome plated molds were found to be satisfactory. Iron containing surfaces seem to catalyze decomposition of the solvent containing polymer during the molding operation.

Too rapid solvent removal under heat and vacuum conditions sometime caused bubbles to appear within the molding. Such flawed panels could be salvaged by resolvating in dichloromethane for about 15 minutes and remolding at 150 to 200°C and 100 psi and completing the gradual devolatilization.

Using the above technique panels of 9 inches × 11 inches × ⅛ inch size were obtained.

The complexity of the above described panel fabrication technique resulting sometimes in flawed (warped, striae) specimens, and especially the length of time required to remove the retained solvent made the use of a direct high temperature, moderate pressure molding technique desirable.

EXAMPLE 5

12 grams of moisture-free polyphenolphthalein carbonate powder were compressed cold in a 5.6 cm (2⅛ inches) diameter mold at a pressure of 98.5 $MN/m^2$ (14,300 psi) to form an opaque biscuit. This was then placed in a heated 7.54 cm (3 inches) diameter round mold whose chrome plated platens were heated to 335°C (635°F) and compressed at 3.9 $MN/m^2$ (568 psi) for about 15 minutes, then the pressure was increased to about 11.7 $MN/m^2$ (1700 psi). The pressure was cycled to permit release of trapped gasses. The actual temperature of the mold was 260–290°C (500°–550°F). The pressure was increased on the second cycle to 29.2 $MN/m^2$ (4300 psi) for 24 minutes at 304°C. The mold was allowed to cool unopened under pressure of about 2 to 4 $MN/m^2$ (285–570 psi). Clear molded discs between 0.32 and 0.64 cm were made in this manner.

Some physical and mechanical properties of the two state-of-the-art materials currently used as aircraft windows, the polymethylmethacrylate (PMM) and polybisphenol A carbonate and the polyether from DGEBA-TMB of Example 1 and the polyphenolphthalein carbonate of Example 4 are compared in Table 1.

these two classes of transparent materials were made in various combinations, using any one of several transparent adhesiveelastomeric interlayers.

Examplary of such interlayer materials are (1) block copolymer of dimethyl siloxane and bisphenol A carbonate; see "Block Polymers" Plenum Press, 1070, p. 263 — R. P. Kambour; (2) low density ethylene - propylene-vinyl acetate terpolymer (ETP) or ethylene Table 1

| Some Physical and Mechanical Properties Compared. | | | | |
|---|---|---|---|---|
| | Polymethyl-methacrylate | Polyether DGEBA-TMB | Polycarbonate | |
| | | | Bisphenol A | Phenol PHTH |
| Specific Gravity, 25°C | 1.19 | 1.195 | 1.20 | 1.27 |
| Refractive Index, $N_D$ 20° | 1.50 | 1.60 | 1.585 | 1.613 |
| Tensile Strength $MN/m^2$ | | | | |
| 25°C | 62.0 | 90.2 | 82.7 | 91.7 |
| 93 | — | — | 57.0 | 77.9 |
| 120 | 0 | 34.5 | — | — |
| 149 | — | — | 31.9 | 60.0 |
| 177 | — | — | 0 | 57.9 |
| 250 | — | — | 0 | 28.0 |
| Impact Strength IZOD, N.m/m of notch | 19.7 | 13.9 | 69.2 | 80.0 |
| Abrasion, Taber 500 gm load, mg loss/1000 cycles | 46.5 | 21.4 | 7.6 | 6.7 |

Of special interest is the retention of tensile strength values of the phenolphthalein derived polymers at 170°C, at which the polybisphenol A carbonate fails, and to over 250°C, making it a useful candidate for the aerodynamic environment encountered during Mach 3 performance. The Izod impact strength values indicate that panels made of this phenolphthalein based polymer can reduce the danger of high speed bird impacts as well as that observed with the polybisphenol A carbonate.

Some of the key thermal properties of these polymers are shown in Table 2.

terpolymer having a molecular weight range from about 89,000 to 105,000 a hydroxyl content of 2.1 to 4.1% and a melt index (ASTM 1238) ranging from 0.7 to 66 gm/10 min.; (3) polyurethane adhesive sold under the trademark Desmocall by Farbenfabriken Bayer A.G.; and (4) siloxane elastomer sold by Dow Corning under the trademark Silastic-Si Rubber, etc.

EXAMPLE 6

A piece of polyether casting 3 inches × 3 inches × ½ inch made according to the procedure given in Example 1, and a piece of 3 inches × 3 inches × ¼ inch of Table 2

| Comparison of Some Key Thermal Properties of Candidate Transparent Materials. | | | | |
|---|---|---|---|---|
| | Polymethyl-methacrylate | Polyether DGEBA-TMB | Polycarbonate | |
| | | | Bisphenol A | Phenol PHTH |
| Heat Distortion Temp., °C, 1750 $kN/m^2$ load, ASTM D-648 | 106° | 112° | 140° | 250° |
| Limiting Oxygen Value, % $O_2$, ASTM D-2863 | 18 | 21 | 23 | 47 |
| Burning Rate, mm/min, ASTM D-635 | 2.14 | 15.0 | W.E. | N.B. |
| Thermal Conductivity W . $cm/cm^2$ . °C. × $10^4$ ASTM C-177 | 2.32 | 3.50 | 1.95 | — |
| Low Temperature Coeff. of Thermal Expansion, per °C. × $10^6$ ASTM D-696 | 50–67 | 42 | 52 | — |

S.E. = self extinguishing.
N.B. = non-burning

The high heat distortion temperature of the polyphenolphthalein carbonate of 250°C again shows its usefulness for sustained performance in the Mach 3 environs. The limiting oxygen value of 47% for this polymer makes it extremely useful for other applications where a high strength nonburning or melting polymer is required.

To take advantage of the high tensile and impact strengths available with the polycarbonate class of polymers and the good thermal and radiation protection afforded by the polyethers from the boroxine cured epoxy resins, DGEBA and Apogen 101, laminates of Lexan, a commercial polybisphenol A carbonate were washed with detergent and water, rinsed with distilled water, alcohol and air dried. A 3 inch × 3 inch piece of 30 mil thick ethylene terpolymer having a molecular weight of 105,000, an OH content of 3.6% and a melt index of 0.7, was washed with alcohol and air dried. This elastomeric film was placed in between the two clean polymeric layers or plates, the assembly placed on a flat plate in a vacuum oven and a flat 4 inch × 4 inch × ⅛ inch aluminum plate placed on top. The oven was evacuated with a mechanical pump, and the temperature was raised over a 2 hour period to 120°C, where the temperature was raised over a 2 hour period to 120°C, where the temperature is held constant for another 1½ hours. The vacuum in the oven was then released and the temperature of the oven reduced gradually to room temperature over a 2 to 3 hour period. A clear, transparent bubble-free laminate was obtained.

EXAMPLE 7

The above laminating procedure was used substituting a 3 inch × 3 inch × ⅛ inch layer or sheet of polyphenolphthalein carbonate obtained by Example 4 for the polybisphenol A carbonate to form a clear well adhered composite with the polyether of Example 1.

EXAMPLE 8

A laminate was made from 3 inch × 3 inch × ¼ inch layer of the polyether obtained from using the methylolated DGEBA (Apogen 101) cured with TMB from Example 2 and a layer of 3 inch × 3 inch × ¼ inch Lexan by using the terpolymer interlayer following the procedure given in Example 6.

EXAMPLE 9

A laminate was made from the polyether of Example 2 and the polyphenolphthalein carbonate of Example 4 using the terpolymer interlayer according to the procedure of Example 6.

EXAMPLE 10

A laminate was made from a 3 inch × 3 inch × ¼ inch layer of polyether of Example 1 and a 3 inch × 3 inch × ¼ inch layer of Lexan, polybisphenol A carbonate, using as the interlayer a clear rubbery sheet of a copolymer of dimethyl siloxane and bisphenol A carbonate, and following the procedure of Example 6.

EXAMPLE 11

A laminate was made from the polyether of Example 1 and the polyphenolphthalein carbonate of Example 4 using the siloxane-carbonate copolymer interlayer material.

EXAMPLE 12

A laminate was made from the polyether from Example 2 and Lexan using the siloxane-carbonate interlayer material.

EXAMPLE 13

A laminate was made from the polyether of Example 2 (Apogen) and the polyphenolphthalein carbonate of Example 4 using the siloxane-carbonate interlayer material.

other possible laminating materials useful for combining the polyethers and polycarbonates described in this disclosure may also include polyvinyl butyral resin such as used in making safety glass, or polymethanes such as described in U.S. Pat. No. 3,629,182.

The resistance of the polymeric transparencies, above, and some of the laminates prepared therefrom to the effect of a jet fuel fire was evaluated by the NASA-Ames T-3 Thermal Test. See Cellular Plastics, Vol. 7, No. 2, 19 71; "Development and Evaluation of Modified Polyisocyanurate Foams for Low-Heating-Rate Thermal Protection," S. R. Riccitiello et al. In this test, samples are placed in the top of a fire box into which JP-4 jet fuel is burned. The heating flux to the sample surface measured by a calorimeter was 11.3 × $10^4$ W/m$^2$. The results are shown in Table 3, showing the time for the various materials, usually in about 1.3 cm thickness, to burn through.

Table 3

| Material | Thickness, cm | Time to Burn Through, sec. | Remarks |
|---|---|---|---|
| Stretched Polymethylmethacrylate | 1.37 | 100 | Shrunken, reticulated appearance, no char |
| Polybisphenol-A carbonate | 1.35 | 460 | Flaky, brittle char |
| Polyphenolphthalein carbonate Example 4 | 0.51 | 540 | Intumescence, ablation-erosion in flame, White opacity on backface |
| DGEBA-TMB Example 1 | 0.64 | 430 | Intumescence, strong black porous char formed |
| | 1.22 | >1080 | Test terminated before burn-through |
| Apogen 101-TMB Example 2 | 1.3 | >1200 | Intumescence, strong finer porous char than from Example 1. |
| Laminates - Made using ETP Adhesive | | | |
| DGEBA-TMB and BPA-PC¹ Example 6 | 0.64 } 1.40<br>0.66<br>0.64 } 1.42* <br>0.66 | 680<br>400 | Delamination and Adhesive burning<br>Delamination and Adhesive burning |
| DGEBA-TMB and Phenol-PC² Example 7 | 0.64 } 1.18<br>0.51<br>0.64 } 1.21*<br>0.57 | 610<br>640 | Delamination and Adhesive burning<br>Delamination and Adhesive burning |

*Polycarbonate side towards heat
All samples size 5.1 × 6.3 cm, results are averages of two runs.

Stretched polymethylmethacrylate, the most widely used aircraft window material, burned through in about 100 seconds. The polyethers, made from both DGEBA (Example 1) and Apogen 101 (Example 2), showed very good resistance to fire although there was some initial surface burning. These materials formed a black porous intumesced chars early in the fire, having good integrity and strength. The char from the Apogen 101 resin had a finer, somewhat more dense and stronger char than did the DGEBA-TMB specimen. These insulative chars protected the material from further intrusion of the fire and in both these cases the materials had not burned through when the tests were terminated at 1080 secs (18 minutes) and 1200 secs (20 minutes) respectively. The polyphenolphthalein carbonate was tested in a 0.51 cm sample since thicker samples were not available. It showed a little intumescence and a white opacity developed throughout the mass as a result of the formation of carbon monoxide and dioxide bubbles within the softened mass, and finally burned through in 540 seconds, about the same time as did the 1.35 cm piece of polybisphenol A carbonate.

of 3.18 N · m. The epoxy-boroxine DGEBA-TMB, 6.6 mm thick, is less effective and breaks at 1.82 N · m. Thirteen-millimeter sections of this material were able to withstand repeated impact at 3.18 N · m. This is a surprising result for a cross-linked aromatic resin system of the ether type.

The sensitivity of the impact strengths of phenolphthalein polycarbonate to molecular weight is also shown in Table 4.

Table 4

Comparison of Impact Resistance of Candidate Materials and Laminates.

| Material | Thickness, cm | Impact Force,* N.m | |
|---|---|---|---|
| Stretched Acrylic | 0.64 | >3.18 | |
|  | 1.27 | >3.18 | |
| Polybisphenol A carbonate | 0.64 | >3.18 | |
|  | 1.27 | >3.18 | |
| Polyphenolphthalein carbonate | 0.42 | 0.91 | $\eta inh = 0.42$ |
|  | 0.51 | >3.18 | $\eta inh = 0.98$ |
| Epoxy-Boroxine DGEBA-TMB | 0.64 | 1.82 | |
|  | 1.27 | >3.18 | |
| Example 1 Laminates — Impacted on DGBA-TMB side | | | |
| DGEBA-TMB and BPA-PC[1] | 0.63 } 1.30<br>0.63 | >3.18 | |
| DGEBA-TMB and Phenol-PC[2] | 0.63 } 1.12<br>0.42 | >3.18 | |

*Gardner Impact Tester
[1]Polybisphenol A carbonate
[2]Polyphenolphthalein carbonate The laminates were evaluated with both the polycarbonate and the polyether layer facing the fire in successive tests. Only the laminates made from the DGEBA-TMB in 0.4 cm thickness and 0.64 cm Lexan, and polyphenolphthalein carbonate in 0.51 cm thickness, using the ethylene-propylene-vinyl acetate interlayer material was evaluated. In every case these equivalent laminates have improved resistance to burn through compared to the state-of-the-art materials (PMM and Lexan).

The principal mode of failure of these prototype laminates during the fire tests has been the softening, delamination and burning of the hydrocarbon adhesive interlayer. Improvements are obtained with laminates made with the more aromatic copolymer of dimethylsiloxane and bisphenol A carbonate as the interlayer bonding agent.

Full-scale 737 airplane windows of polyether of DGEBA-TMB were prepared by the method described earlier. These windows were evaluated using a stretched polymethylmethacrylate 737 window as a control. An oil burner that provided a heat flux of 11.3 × 10⁴ W/m² was used to simulate a JP-4 fuel fire. The stretched acrylate window exposed to this environment exhibited the typical melting and reticulation with combustion; burn-through occurred in about 1 minute. The polyether of DGEBA-TMB prototype exposed to the same environment formed a hard, tough, surface char, which maintained internal protection for this window for about 6 minutes or about six times that of the standard window. Burn-through occurred from thermomechanical failure due to a small amount of stress.

To compare the impact resistance of these new candidate polymers and their laminates with the state-of-the-art materials, the simple Gardner falling weight method was used. In this test, a 908-gm weight with a 13.2-mm ball on the end is dropped a distance of 35.6 cm. As shown in Table 4, at 6.6 mm and 13.2 mm thicknesses, the stretched acrylic and the bisphenol-A polycarbonate are well able to resist repeated impacts Two thicknesses at two molecular weights were examined by means of the falling weight impact test. A polymer with an average molecular weight of about 30,000 indicated by an intrinsic viscosity of 0.42 broke at 0.91 N · m of impact, while the polymer having a molecular weight of about 100,000 with an intrinsic viscosity of 0.98 resisted repeated impacts at 3.18 N · m. A 13.2 mm laminate comprised of two 6.6 mm sections of DGEBA-TMB and bisphenol-A polycarbonate bonded with the ethylene terpolymer adhesive withstood repeated impacts of 3.28 N · m. The DGEBA-TMB face of the laminate cracked after the fifth impact but remained intact. Similar results were obtained from the DGEBA-TMB phenolphthalein polycarbonate laminate even though the thickness of the phenolphthalein polycarbonate underlayer was about ½ the thickness of the bisphenol-A polycarbonate. The results show that the use of the adhesive inner layer with the polycarbonate backup sheet can provide improved impact strength in the laminated structure, taking advantage of the thermal resistance of DGEBA-TMB.

One unexpected and interesting result has been the discovery of the resistance of the polyether from DGEBA and TMB of Example 1 to high intensity coherent radiation. Radiation is the principal mode of heat transfer to the surface of an object immersed in a large jet fuel-fire environment. It was of interest to compare these candidate polymers with state-of-the-art materials to determine their response in a pure thermal radiation environment. About 50 mm × 50 mm specimens were exposed to an 8 mm diameter, 260 W $CO_2$ laser beam at 10.6μ for exposure time up to 1 minute. The polymethylmethacrylate and DGEBA-TMB samples exposed were about 13.2 mm thick whereas the phenolphthalein polycarbonate was available only in 3.2 mm thick pieces. Tests were run both in still air and at Mach 1 air velocity. It was found that polymethylmethacrylate burned through, leaving a clear hole with no char formation in about 6.5 seconds in still air, whereas in a Mach 1 airflow it burned through in only 2.9 seconds. For DGEBA-TMB, at an exposure time of 60 seconds, there was a penetration of approximately 3.2 mm in the still air and 6.5 mm in the Mach 1 airflow; a hard, tough, black, nodular char formed in the area of impact. Phenolphthalein polycarbonate was evaluated only in still air in a thickness only about ¼ of the reference pieces and was not burned through after about 29 seconds. It had about five times the resistance to laser penetration as the acrylate, but, as expected from the thermal protection correlation, it was not as good as the DGEBA-TMB. It formed a fragile char with a penetration of about 1 mm backed by the formation of an ivory-like white zone within the structure itself. None of the samples showed any tendency to crack or undergo thermal shock. The white opacity, which serves to block partially the radiation in the case of phenolphthalein polycarbonate, is due to the decarbonylation and trapping of $CO_2$ within the polymer sample. These show that the epoxy and polycarbonate are superior to the polymethylmethacrylate in preventing radiation penetration of a $CO_2$ laser. It suggests that the same char-forming and ablation mechanisms that are useful in rejecting the heating environment of a large jet fuel fire and of reentry into the earth's atmosphere are also applicable in rejecting the energy deposited by a $CO_2$ laser.

It is expected that the final window configuration will also be coated, as are the presently used windows and canopies, with an abrasion resistant coating of which there are several available commercially.

Examples of such coatings are: (1) a fluorocarbon copolymer containing silica marketed by Dupont Co. under the tradename Abcite; (2) a hard silicone polymer sold by Owens-Illinois Co. under the tradename Glass Resin; and (3) a silicone polymer product sold under the name Magic Wondercoat by the Imperial Protector Co.

What is claimed is:

1. A transparent heat-, fire- and impact-resistant laminate structure comprising:
    1. a heat resistant layer of an epoxy resin cured to a hard solid with an alkoxy boroxine catalyst,
    2. a layer of high impact strength aromatic polycarbonate resin selected from a polybisphenol A carbonate resin or a polyphenolphthalein carbonate resin, and
    3. intermediate said layers, a transparent adhesive elastomeric interlayer.
2. The structure of claim 1, wherein the epoxy resin is a diglycidyl of bisphenol A.
3. The structure of claim 2, wherein the epoxy resin is a methylolated derivative of a diglycidyl polyether of bisphenol A.
4. The structure of claim 1, wherein the aromatic polycarbonate is a polybisphenol A carbonate.
5. The structure of claim 1, wherein the aromatic polycarbonate is a polyphenolphthalein carbonate resin.
6. The structure of claim 5, wherein the molecular weight of the polycarbonate ranges from 30,000 to 100,000.
7. The structure of claim 1, wherein the catalyst is trimethoxyboroxine.
8. The structure of claim 1, wherein the laminate structure is coated with a thin transparent polymeric abrasion resistant material.
9. A transparent heat-, fire- and impact-resistant laminate structure comprising:
    1. a heat resistant layer of a transparent diglycidyl polyether bisphenol A resin cured to a hard solid state with a trimethyoxy boroxine catalyst,
    2. a layer of high impact strength polyphenolphthalein carbonate resin having a molecular weight ranging from 30,000 to 100,000, and
    3. intermediate said layers, an adhesive transparent interlayer comprising a block copolymer of dimethyl siloxane and bisphenol A polycarbonate.
10. The structure of claim 8 wherein the polymeric abrasion resistant material consists of a hard transparent silicone polymer.

* * * * *